United States Patent
Keller

[19]

[11] Patent Number: 5,807,199
[45] Date of Patent: Sep. 15, 1998

[54] HYDRO-MECHANICAL GEARBOX

[76] Inventor: Gottfried Keller, Siedlung Nr. 4, DE-97956 Werbach/Wenkheim, Germany

[21] Appl. No.: 645,624
[22] Filed: May 14, 1996

[30] Foreign Application Priority Data

Feb. 12, 1996 [DE] Germany ............... 196 05 386.2

[51] Int. Cl.$^6$ ............................................. F16H 47/04
[52] U.S. Cl. ........................................... 475/72; 475/82
[58] Field of Search ........................... 475/72, 78, 80, 475/82, 83

[56] References Cited

U.S. PATENT DOCUMENTS 5,403,241  4/1995  Jarchow et al. ..................... 475/72

FOREIGN PATENT DOCUMENTS

| 9382898 | 1/1956 | Germany | 475/72 |
| 2144063 | 9/1980 | Germany | 475/72 |
| 3303886 | 12/1983 | Germany | 475/72 |
| 914314 | 1/1963 | United Kingdom | 475/72 |
| 2236364 | 4/1991 | United Kingdom | 475/82 |

Primary Examiner—Khoi Q. Ta
Attorney, Agent, or Firm—Frank H. Foster; Kremblas, Foster, Millard & Pollick

[57] ABSTRACT

The invention relates to a hydro-mechanical gearbox with a hydraulic pump, a hydraulic motor and a set of planetary gears, whereby the pressure line of the hydraulic pump is conducted back, via the inserted hydraulic motor, to the suction line of the hydraulic pump, thereby forming a circuit, and whereby either the sun wheel or the planet-carrier of the set of planetary gears is coupled in a rotationally fixed manner to the driven shaft of the gearbox, and the other one of these two elements of the planetary gear is coupled in the same manner to the output shaft of the gearbox, and the hollow wheel is coupled to a rotational unit of the hydraulic pump, preferably to its casing, while the other rotational unit of the hydraulic pump is coupled to the frame or to the output shaft of the gearbox; according to the invention one rotational unit of the hydraulic motor, preferably its rotor, is coupled in a rotationally fixed manner to the driven shaft of the gearbox, and the other unit of the hydraulic motor, preferably its static part, is coupled either to the frame/housing of the gearbox or to its output shaft.

14 Claims, 4 Drawing Sheets

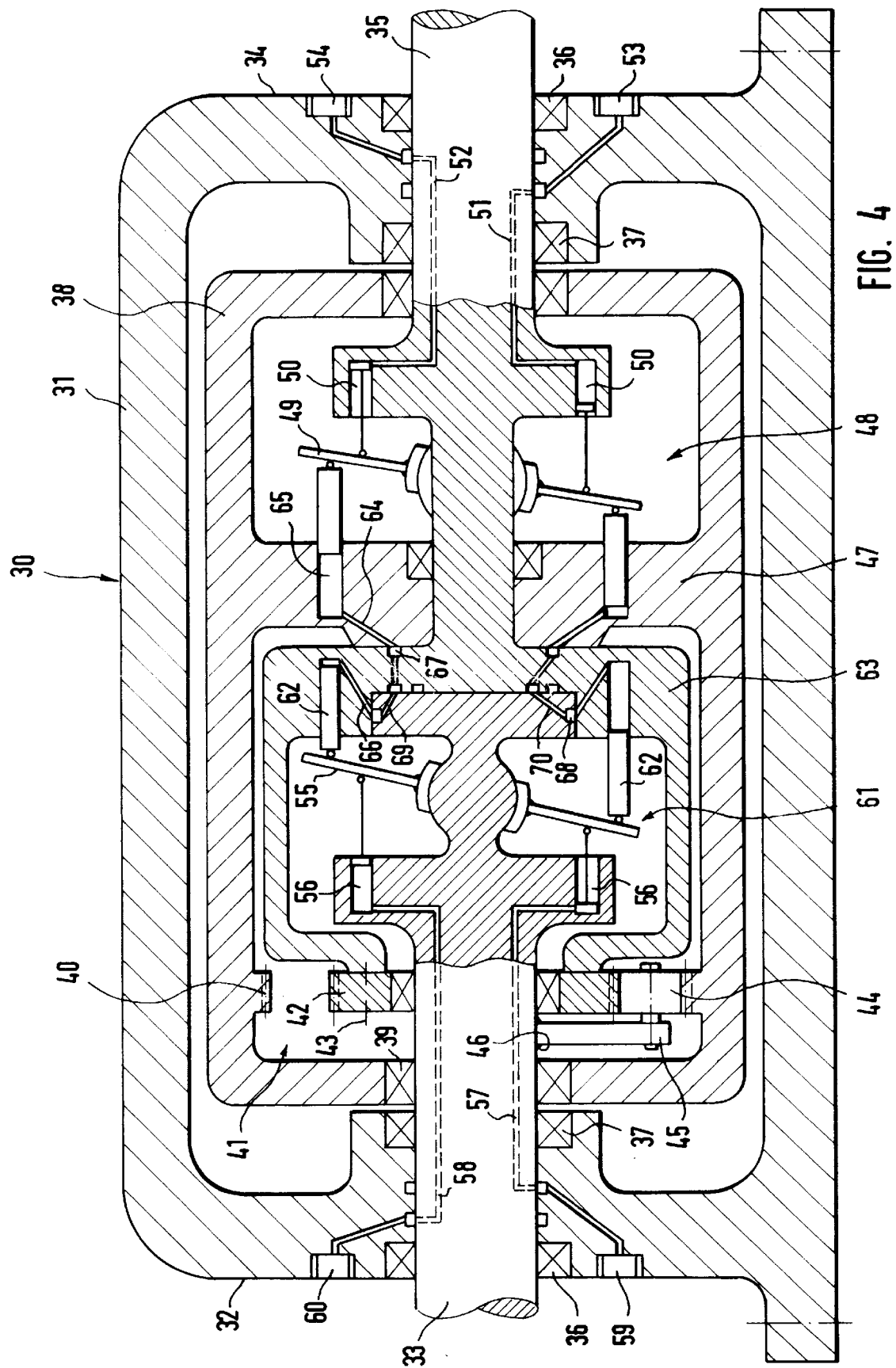

HYDRO-MECHANICAL GEARBOX

TECHNICAL FIELD

The invention relates, on the one hand, to a hydro-mechanical gearbox with a hydraulic pump, a hydraulic motor and a set of planetary gears, whereby the pressure line of the hydraulic pump is conducted back, via the inserted hydraulic motor, to the suction line of the hydraulic pump, thereby forming a circuit, and whereby either the sun wheel or the planet-carrier of the set of planetary gears is coupled in a rotationally fixed manner to the driven shaft of the gearbox, and the other one of these two elements of the planetary gear is coupled in the same manner to the output shaft of the gearbox, and the hollow wheel is coupled to a rotational unit of the hydraulic pump, preferably to its casing, while the other rotational unit of the hydraulic pump is coupled to the frame or to the output shaft of the gearbox and, on the other hand, the invention relates to a method of controlling such gearboxes installed in vehicles.

BACKGROUND ART

A series of gearbox designs, which also include the hydraulic gearbox in which a hydraulic pump drives a hydraulic motor via an oil circuit, have become known from the prior art. In hydraulic gearboxes of this kind, however, the efficiency declines rapidly with rising rotational speeds, since flow resistances make themselves felt in a disadvantageous manner as the speed of flow of the hydraulic oil increases. Consequently, a particularly large amount of energy is wasted precisely when the maximum output is required of the gearbox, with the result that the internal-combustion motor providing the drive has to be overdimensioned to a relatively major extent.

These disadvantages of the arrangements known from the prior art result in the problem, which is initiating the present invention, of designing an infinitely variable gearbox which develops its optimum efficiency precisely when the maximum throughput of energy occurs.

BRIEF DISCLOSURE OF INVENTION

This problem is successfully solved in a gearbox of the above described type when one rotational unit of the hydraulic motor, preferably its rotor, is coupled in a rotationally fixed manner to the driven shaft of the gearbox, and the other unit of the hydraulic motor, preferably its static part, is coupled either to the frame/housing of the gearbox or to its output shaft. As will be further explained later on, in an arrangement of this type, the delivery quantity of the hydraulic pump declines as the rotational speed of the output shaft rises, until it finally becomes absolutely zero at a maximum rotational speed. This means that, at high rotational speeds at which the greatest output is taken off at the output shaft, no flow losses occur in the hydraulics and therefore the efficiency reaches its maximum. Because of its favorable efficiency, a gearbox of this type permits a reduction in the structural size of the driving motor. As one rotational part of the hydraulic motor is coupled in a rotationally fixed manner to the driven shaft of the gearbox, it is possible to transfer rotational energy from the output shaft of the gearbox through the hydraulic oil circuit to the driven shaft, so that in the case of a pushing load the stabilizing characteristics of a combustion engine can be used to limit the rotational speed of the gearbox elements. The inventive hydro-mechanical gearbox offers the possibility of controlling the speed of a vehicle through the gear ratio, while the combustion engine runs at a nearly constant speed, where the torque is as high as possible or its efficiency has its best value. The dynamical characteristics of the inventive gearbox are superior, because at a standstill of the vehicle the hydraulic pump runs at a high speed, so that a great amount of rotational energy is stored within its rotating masses. When the vehicle starts, these rotating masses are decelerated, whereby the stored amount of energy is delivered at the output shaft additionally to the amount of energy, which is directly transmitted from the combustion engine. So at the moment, when the vehicle starts, the inventive hydro-mechanical gearbox may have an efficiency of more than 100%. This aspect is very important for tractors for agricultural purposes, which operate often at a rough or steep landscape. If the tractor has to start from an inclined position, at the moment of disconnecting the brake the gearbox has to deliver the full output at its output shaft.

One possible way of adjusting the gearing ratio of the gearbox according to the invention consists in the fact that the delivery quantity of the hydraulic pump is adjustable. With the intake volume of the hydraulic motor unchanged, it is possible, by adjusting the delivery quantity of the hydraulic pump, to change the braking action of the latter and in this way achieve an adjustment of the gearing of the gearbox. Axial piston pumps, for example, are suitable for this purpose since, in the case of these pumps, the inclination of the oblique disc actuating the axial piston is adjustable during operation. Axial control pistons, which are connected to the pump casing in a rotationally fixed manner, are used for this purpose.

A hydraulic motor offers a greater or lesser working resistance, depending upon the mechanical load, to the hydraulic oil taken in, and can therefore be used for throttling the flow of oil. One particular advantage of such an arrangement lies in the fact that the energy drawn off as a result of the throttling-down of the hydraulic pump providing the drive is not lost but is re-introduced to the driving shaft of the gearbox in the form of an additional torque, so that the combustion engine is unburdened. Since it is also possible, by varying the throttling, to influence the braking action of the hydraulic pump and, with it, the gearing ratio of the gearbox according to the invention, the said invention provides for the possibility of adjusting the intake volume of the hydraulic motor. If, therefore, the intake volume of the hydraulic motor is set lower than the delivery volume of the hydraulic pump, the delivery flow of the latter is supported on the hydraulic motor, so that the hydraulic pump is braked. The use of an axial piston motor as the hydraulic motor suggests itself since, in the case of the said hydraulic piston motor, adjustment of the intake volume is possible by changing the inclination of the oblique disc actuated by the axial control piston. A hydraulic motor of this kind is based on a reversal of the operation of the hydraulic pump principle, so that the hydraulic motor can be constructed, at least in principle, so as to be structurally identical to the hydraulic pump coupled to the set of planetary gears.

It lies within the scope of the invention that the control pistons for the hydraulic pump, and also, optionally, for the hydraulic motor, are hydraulically actuated. In this event, the hydraulic pressure necessary for this purpose can be taken off, in a particularly advantageous manner, from a gas pressure/spring reservoir which is fed by the hydraulic pumps of the gearbox according to the invention.

The adjusting arrangements may be controlled, for example, with the aid of a control computer to which the rotational speed of the driving motor is communicated and which undertakes the corresponding setting of the hydraulic pumps and also of the throttle elements with the aid of a specific driving program.

The basic principle of the gearbox according to the invention, as described above, consists in the fact that the gearing ratio of the gearbox is adjusted by influencing either the rotational speed of the hollow wheel or the relative rotational speed between the hollow wheel and the output shaft, depending upon the form of construction, by a braking of the hydraulic pump, which braking is controlled by the hydraulic motor. The limiting conditions of the arrangement according to the invention consist, on the one hand, in the fact that one part of the set of planetary gears is rigidly coupled to the motor shaft and therefore constantly revolves at the rotational speed of the motor. If, for example, a vehicle provided with the gearbox according to the invention is at a standstill, the output shaft, which is connected in a rotationally fixed manner to the driven wheels of the vehicle, must likewise be at a standstill. Consequently, the planet wheels rotate in a manner corresponding to the rotation of the sun wheel/planet-carrier and therefore transfer the rotational movement of the latter to the hollow wheel. In this operational condition, therefore, the hollow wheel rotates at relatively high speed. Through the fact that the rotational speed of the hollow wheel is now deflected out of the state of equilibrium just described, for example by the fact that the hollow wheel is braked by the hydraulic pump, the output shaft is also set in rotation at the same time and the vehicle starts off.

An ingenious development of the invention is distinguished by the fact that, at zero delivery or a zero setting of the input shaft, rotational energy is transferred to the hollow wheel via the planet wheels, so that no output is emitted at the output shaft (idling). In the event of zero delivery, no output is produced by the hydraulic pump, so that the said output does not brake the hollow wheel. As a result of this, the hollow wheel is able to accelerate to any desired rotational speeds, which are communicated to it by the input shaft via the planet wheels.

On the other hand, either the rotational speed of the hollow wheel or the relative rotational speed between the hollow wheel and the output shaft, depending upon the form of construction, becomes zero at full throttling. Because of this, in the form of construction with a coupling between the hydraulic pump and the output shaft, the latter revolves, in this operational condition, at the same rotational speed as the driving shaft of the gearbox according to the invention. At full throttling, the oil circuit is at a standstill and the hydraulic pump is not able to deliver It is therefore braked to zero and communicates the fact that it is at a standstill both to the hollow wheel and also to the output shaft, by impressing the same rotational speed upon them. Through the fact that these two elements of the set of planetary gears are no longer performing any relative movement, the planet wheels likewise come to a halt and ensure, because of the engagement of their toothing with the sun wheel, that both the planet-carrier and also the hollow wheel revolve at the same speed as the sun wheel. The connection between the driving and output shafts of the gearbox according to the invention is now rigid, and the rotational speed gearing ratio is 1:1.

As a result of coupling to a control computer, this synchronous operation can be associated with a specific rotational speed of the driven shaft/motor and/or of the output shaft/vehicle. The gearbox according to the invention therefore provides an infinitely variable transition from standstill to maximum rotational speed of the output shaft and, in doing so, additionally takes over the function of a conventional clutch, in that an idling function additionally occurs at standstill.

It has proved particularly favorable for the diverted energy to be conducted back via the hydraulic motor at partial throttling. The effect of this measure is that, even at low rotational speeds of the output shaft, at which a considerable portion of the energy supplied by the driving motor is diverted in the hydraulic pump, the output shaft is able to act upon the driving shaft again via the hydraulic motor. The consequence of this is that hardly any energy is lost inside the gearbox and the driving motor has to emit, at any given time, only as much energy as is actually needed at the output spindle.

In one particular type of operation, (hydraulic motor drives hydraulic pump), the hydraulic pump is not only braked to its zero rotational speed but is even set in rotation, oppositely to its direction of delivery, so that the hollow wheel now revolves not only at a rotational speed that corresponds to the rotation of the input shaft but even at a higher speed. As a result, the planet wheels rotate in such a manner, that the rotational speed of the output shaft is above the synchronous rotational speed of the input shaft (hypersynchronous range, cruising or economy gear).

In another of these operational phases (braking or pushing operation), the hydraulic pump is driven in a similar way to when the vehicle is at a standstill, the hollow wheel being driven in its normal direction of rotation. This form of functioning gives rise to a slowing-down of the output shaft if the working point of the gearbox is adjusted to a rotational speed which is correspondingly below the current rotational speed. With the arrangement according to the invention, not only is braking to a rotational speed of zero possible, but so is the production of an active counter-moment that permits rearward travel.

Further features, details and advantages based on the invention emerge from the following description of several examples of embodiment of the invention, and also with the aid of the drawing.

BRIEF DESCRIPTION OF DRAWINGS

FIG. 4 is another embodiment of the invention in a longitudinal section.

Figure 1:
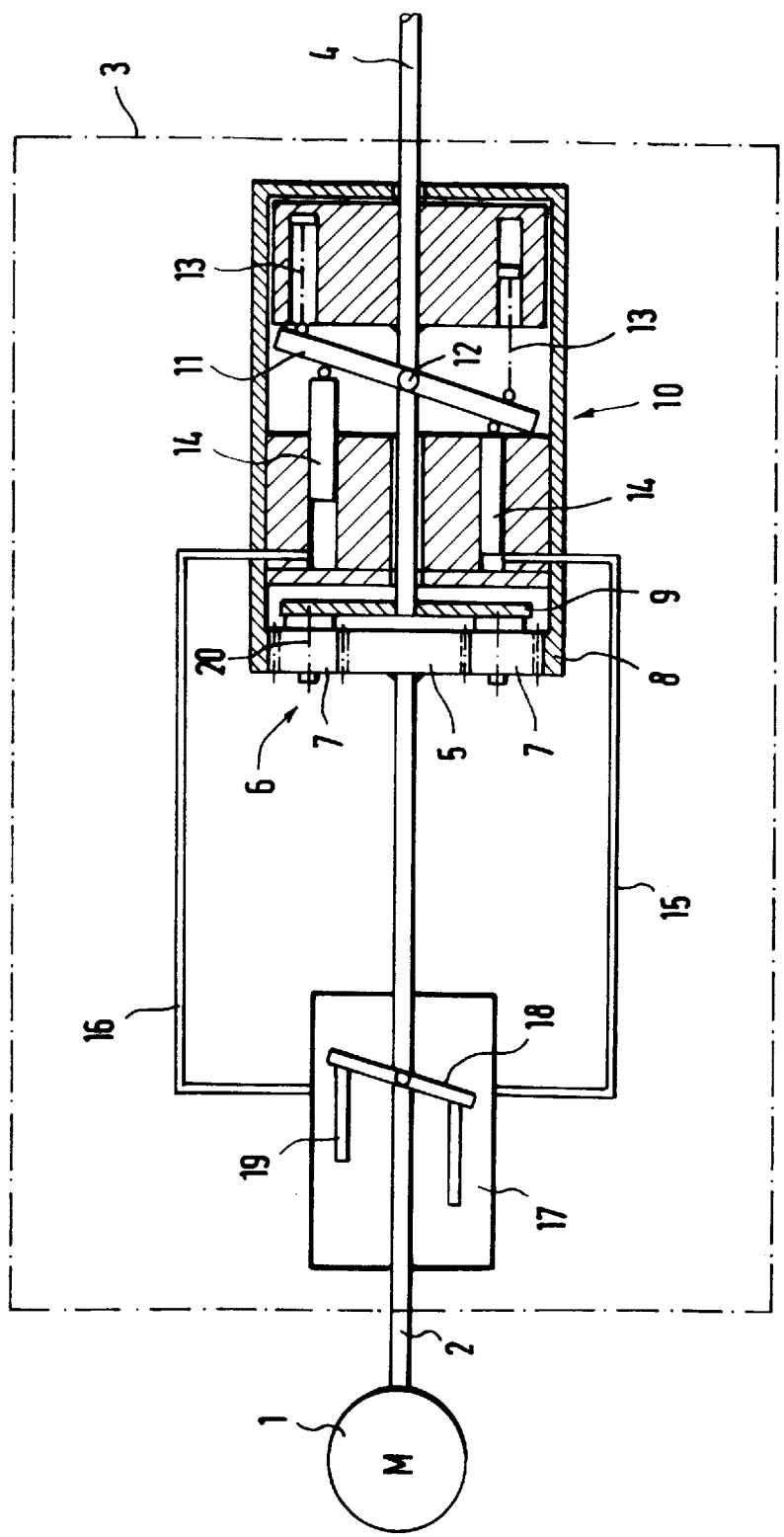
FIG. 1 is a diagrammatic sketch of a gearbox according to the invention, the central structural unit being represented in longitudinal section and thus in more detailed form FIG. 2 a second embodiment of the invention in a manner of representation similar to FIG. 1.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art.

DETAILED DESCRIPTION

FIG. 1 shows a drive according to the invention, with an internal combustion motor 1, the output shaft 2 of which at the same time represents the driving shaft of the gearbox 3 according to the invention, and the output shaft 4 of which can be coupled in a rotationally fixed manner to the wheels of a vehicle, for example.

The sun wheel 5 of a set of planetary gears 6, which consists of planet wheels 7 and a hollow wheel 8, is fixed in a non-twistable manner on the driving shaft 2 of the gearbox 3. The planet-carrier 9 is connected in a non-twistable manner to the output shaft 4 of the gearbox 3.

At a predetermined rotational speed of the driving shaft 2, the rotational speed of the output shaft 4 is governed by the rotational speed of the hollow wheel 8. In order to be able to influence the rotational speed of the latter, relative to the output shaft 4, there is arranged inside the said hollow wheel 8 a hydraulic pump 10, the casing of which is constructed so as to be integrated or in one piece with the hollow wheel 8.

The oblique disc 11 of the hydraulic pump 10, which is constructed as an axial piston pump, is fixed on the output shaft 4 so as to be twistable about an axis 12 at right angles to the said shaft, but otherwise non-displaceable. The inclination of the oblique disc 11 is influenced by a number of control cylinders 13. In the event of a relative rotation of the hollow wheel 8 in relation to the planet-carrier 9, and therefore to the output shaft 4, the pump pistons 14 are moved cyclically to and fro in the direction of the output shaft 4 by the oblique disc 11, as a result of which hydraulic oil is sucked in, for example at the lower pressure line 15, and delivered by the hydraulic pump 10 to the upper pressure line 16.

The two hydraulic lines 15, 16 are connected via a hydraulic motor 17, so that a closed oil circuit 15, 10, 16, 17 is produced. The hydraulic motor 17 is constructed according to the same principle as the hydraulic pump 10, with the difference that in this case the operating principle is reversed during normal operation, and it is not that a rotary motion sets the oil circuit 15, 16 in motion, but instead the flow of oil 15, 16 is set in mechanical motion by the hydraulic motor by means of its oblique disc 18 and of driving axial pistons 19 acting upon the latter, and is introduced to the driving shaft 2 in the form of additional driving energy. Under these circumstances, the flow of oil 16 coming from the hydraulic pump 10 is simultaneously supported by the hydraulic motor 17, the intake volume of which is limited in a variable manner, and this gives rise to limitation of the rotational speed of the hydraulic pump 10.

The energy taken off by the hydraulic pump 10 inside the gearbox 3 is therefore fed back to the input shaft 2 of the gearbox 3 again by the hydraulic motor 17, and is consequently not lost. This means that, apart from friction losses, the driving motor 1 has to supply only as much energy as is also actually taken out at the output shaft 4 of the gearbox.

The more sharply the oblique disc 11 is inclined in relation to the output shaft 4 and its point of rotation 12, the greater is the delivery output of the hydraulic pump 10 and consequently its braking moment also. On the other hand, the working output of the hydraulic motor 17 rises as the inclination of its oblique disc 18 increases, as a result of which, conversely, the speed of flow inside the hydraulic circuit 15, 10, 16, 17 drops off.

Since the oblique disc 18 of the hydraulic motor 17 revolves, in any case, at the same rotational speed as the sun wheel 5, its inclination in respect of the inclination of the oblique disc 11 can be adjusted in such a way that its intake volume corresponds absolutely precisely, at this rotational speed, to the delivery output of the hydraulic pump 10. If the intake volume of the hydraulic motor 17 is now reduced, by changing the inclination of the oblique disc 18, the rotational speed of the hydraulic pump 10 is also reduced, and the rotational speed of the output shaft 4 rises.

If the oblique disc 18 is adjusted so as to be exactly at right angles to the driving shaft 2, the flow inside the oil circuit 15, 10, 16, 17 comes to a complete stop and consequently the hydraulic pump 10 is likewise braked to a standstill. This means that the relative rotational speed between the hollow wheel 8 and the planet-carrier 9 becomes zero, and this has the consequence that the planet wheels 7 are no longer able to rotate about their axes 20. For this reason, they are no longer able to roll round on the sun wheel 5 and the planet-carrier 9, and consequently the output shaft 4 has the same rotational speed as the sun wheel 5 or the shaft 2 driving the latter. In this condition, the sun wheel 5, hollow wheel 8 and planet-carrier 9 revolve at the same rotational speed, as a rigid unit so to speak, and the rotational speed at the output shaft 4 keeps to that of the driving motor 1.

In this condition, no oil whatsoever is circulating any longer, so that the losses of the gearbox 3 are confined to the friction losses in the bearings and are therefore extremely low, and the gearbox has its optimum efficiency.

At lower speeds of the vehicle, a gearbox setting which augments the torque but lowers the rotational speed of the driving motor 1 can be undertaken by adjusting the inclination of the oblique disc 18.

Figure 2:
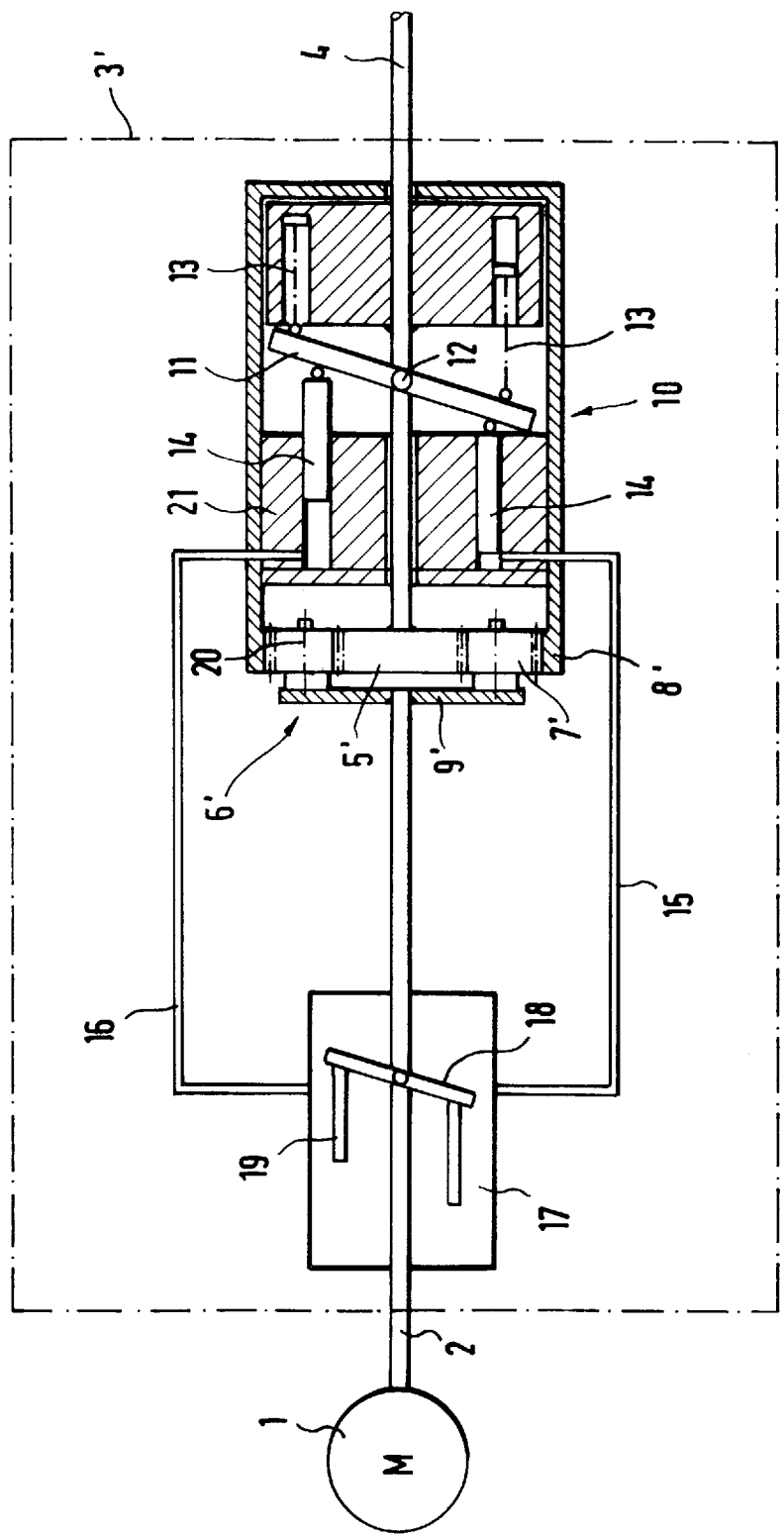

FIG. 2 represents a second embodiment of the invention, which differs from the arrangement according to FIG. 1 only in the fact, that the rotational elements of the set of planetary gears 6' are coupled in a different manner to the driven shaft 2 and to the output shaft 4 of the gearbox 3'. So the same parts of these two arrangements are provided with the same numbers.

In the gearbox 3' of FIG. 2 the sun wheel 5' of the set of planetary gears 6' is fixed to the output shaft 4, while the planet-carrier 9' is fixedly secured to the driven shaft 2. The functioning of this arrangement is rather similar to that of FIG. 1 with the difference, that at a standstill of the output shaft 4 and the sun wheel 5', the planet wheels 7' roll around the sun wheel 5' with a speed corresponding to the rotational speed of the planet-carrier 9'/driven shaft 2. This results in that the hollow wheel 8' rotates in the same direction than the driven shaft 2, which is the same direction of the revolution of the output shaft 4 at synchronous operation. For that reason the rotational movement of the hollow wheel 8' must not be reversed during the starting sequence of the vehicle. Therefore even at higher rotational speeds of the output shaft 4, the hollow wheel 8', which is integrated with the housing of the hydraulic pump 10, is not accelerated, but only decelerated from a higher rotational speed down to the synchronous speed of the input shaft 2, whereby additional energy can be delivered at the output shaft 4. A second aspect is, that at a standstill of the output shaft 4 the revolving speed of the housing of the hydraulic pump 10 is higher than the rotational speed of the input shaft 2 (hypersynchronous range), so that a higher amount of rotational energy can be stored for use during the starting sequence of the vehicle.

Figure 3:
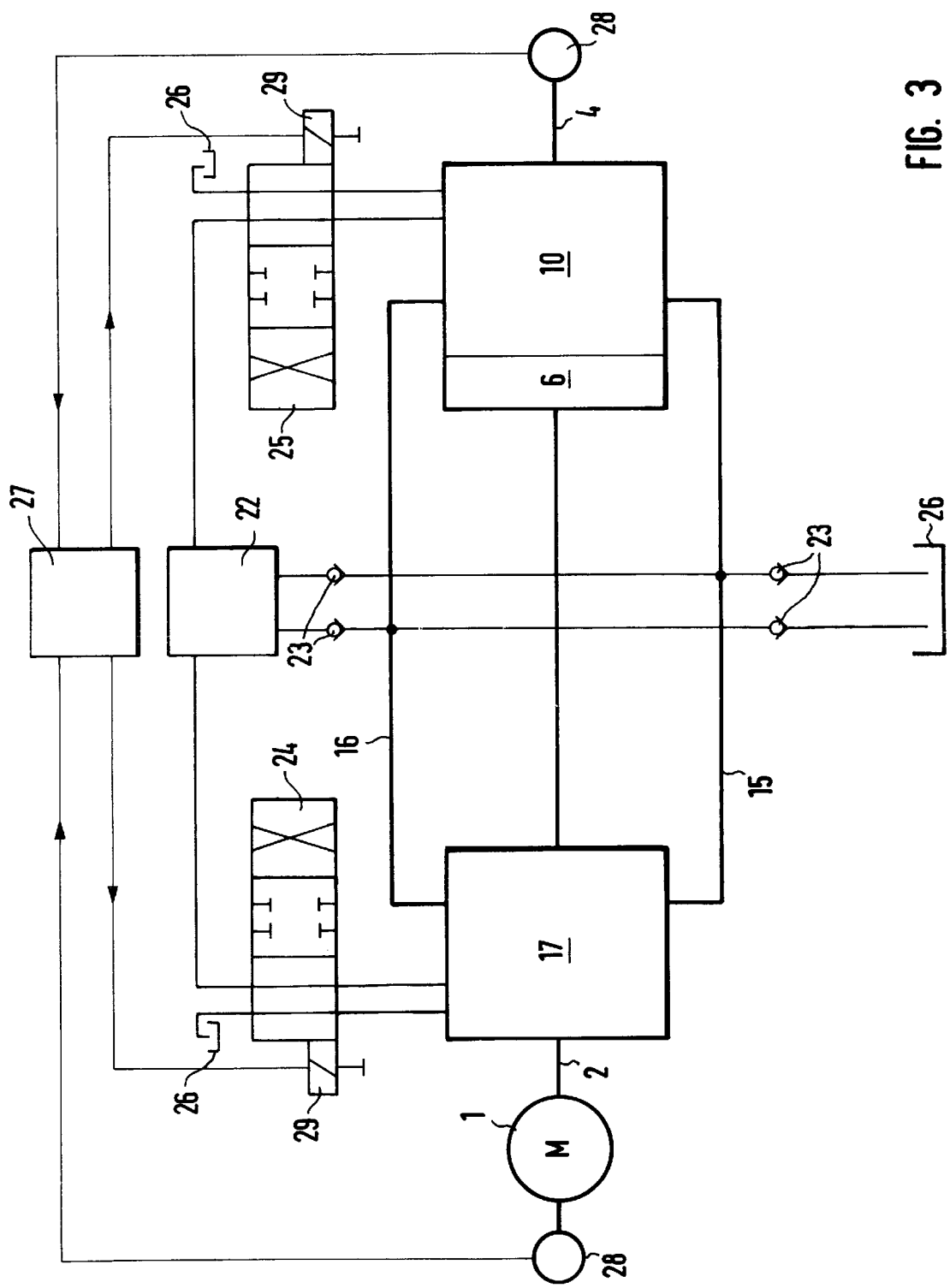
FIG. 3 is a circuit diagram with the control elements for adjusting the hydraulic elements.

FIG. 3 gives an overview of the control mechanism for adjusting the delivery quantity of the hydraulic pump 10 and of the intake volume of the hydraulic motor 17. This control circuit is suitable for both embodiments of the inventional gearbox, which are shown in FIGS. 1 and 2. A pressure reservoir 22 is fed by that hydraulic line 15, 16 of the oil circuit, to which hydraulic oil is delivered by the hydraulic pump 10. One way valves 23 make sure, that the pressure within the reservoir 22 is retained, even if the delivery quantity of the hydraulic pump 10 is low for some time.

During the adjustment of the oblique discs 11, 18 oil may flow through a control valve 24, 25 and through the connected hydraulic element 10, 17 to an hydraulic oil sump 26. From there the oil is sucked by the hydraulic pump 10 through further one way valves 23 into the low pressure line 15, 16. The control valves 24, 25 have three positions, and in a medium position all input control lines of the coupled hydraulic elements 10, 17 are disconnected from the pressure reservoir 22 as well as from the oil sump 26, so that the oblique discs 11, 18 remain unchanged and no oil flows within the control circuit.

A control computer 27 governs all elements of the inventional gearbox 3. Therefore this control computer 27 receives electric input signals from two rotational speed sensors 28, one of which is coupled to the driving motor 1, while the other speed sensor is coupled to the output shaft 4. From these input signals the control computer 27 calculates the necessary adjusting positions of the oblique discs 11, 18 according to the inventional operating method. The computer 27 controls the actual positions of the oblique discs 11, 18 by activating the coils 29 of the control valves 24, 25 in a suitable manner.

FIG. 4 shows an embodiment of the invention, which has a most favorable efficiency. This gearbox 30 is enclosed within a nearly cylindrical housing 31, which is penetrated at one end face 32 by the driven shaft 33 and at its opposite end face 34 by output shaft 35, which is in line with the input shaft 33. At each penetration point of the shafts 33, 35 through the housing 31 of the gearbox 30 two ball-bearings 36, 37 are arranged with an axial distance for supporting of the said shafts 33, 35. As a result of these double-bearings 36, 37 the stub-shafts 33, 35, which project into the housing 31 of the gearbox 30, need no further bearings and are even able to support a further rotational unit, which has the form of an internal casing 38, by ball-bearings 39. This internal casing 38 shows an internal toothing 40 representing the hollow wheel of a set of planetary gears 41. The sun wheel 42 of this planetary gear 6 is fixedly secured to the output shaft 35, for example, with axial screws 43, while the planet wheels 44 are rotatably mounted to a planet-carrier 45, which is welded 46 to the driven shaft 33. Therefore the coupling of the set of planetary gears 41 corresponds with the embodiment according to FIG. 2

Similar to the arrangement of FIG. 2 the hollow wheel 40, which is a part of the internal casing 38, is integrated with the piston drum 47 of a hydraulic pump 48. The oblique disc 49 of this hydraulic pump 48 is secured to the output shaft 35 in such a manner, that it can be inclined with response to the longitudinal axis of the output shaft 35, but cannot be rotated with respect to that shaft 35. The inclination of the oblique disc 49 is controlled by a number of control cylinders 50, which are connected via internal hydraulic lines 51, 52 with union-joints 53, 54 for supporting hydraulic pressure from external hydraulic control lines.

In a like manner a second oblique disc 55 is arranged at the driven shaft 33, which rotates always at the same speed as the driven shaft 33, but can be inclined with respect to that shaft 33. The inclination angle of the oblique disc 55 can be adjusted by control cylinders 56. For this purpose the hydraulic lines 57, 58 of these cylinders 56 are fed to connecting elements 59, 60 of the housing 31, where external hydraulic control lines can be fastened. The oblique disc 55 is part of a hydraulic motor 61, whose pistons 62 are enclosed within a piston drum 63, which is fixedly secured or integrated with the output shaft 35.

Similar to the arrangement according to FIG. 2, the hydraulic elements, that is the hydraulic pump 48 and the hydraulic motor 61, are connected together through an oil circuit. For this purpose the hydraulic connections 64 of the pistons 65 of the hydraulic pump 48 are fed to an end face of the piston drum 47, and in a similar manner the hydraulic connections 66 of the pistons 62 of the hydraulic motor 61 are fed to an internal surface of the piston drum 63 of the hydraulic motor 61. A part of the driven shaft 33 as well as a part of the output shaft 35 is formed in the shape of a control disc and arranged near the outlets of the hydraulic connection lines 64 and 66, respectively. Each of these two control discs comprises two control notches 67, 68 in the shape of a semicircle. Each of the two control notches 67 is connected with one of the control notches 68 through a hydraulic line 69, 70. These hydraulic lines 69, 70 correspond to the hydraulic lines 15, 16 according to FIG. 1 and 2. Within this embodiment it is advantageous to use a different hydraulic pump for the control hydraulic.

The operation of the gearbox 30 of FIG. 4 corresponds with the operation of the arrangement according to FIG. 2, with an exception, which results from the fact that the piston drum 63 of the hydraulic motor 61 is not fixed to the housing 31 of the gearbox 30, but to the output shaft 35. Therefore at synchronous operation of the gearbox 30 (output shaft 35 revolves at the same speed than the input shaft 33) all parts of the set of planetary gears 41, of the hydraulic pump 48 and of the hydraulic motor 61 rotate at the same speed. As a result, the only losses of the gearbox 30 may occur within the ball-bearings 36, 37, and the efficiency of this gearbox 30 at synchronous operation can be nearly 100%.

While certain preferred embodiments of the present invention have been disclosed in detail, it is to be understood that various modifications may be adopted without departing from the spirit of the invention or scope of the following claims.

I claim:

1. A hydro-mechanical gearbox for controlling the rotation ratio between a driven shaft and an output shaft member, the gearbox comprising:
   (a) a planetary gear train housed in a housing member and having a sun wheel element, a planet carrier element and a hollow wheel, one of said elements coupled to the driven shaft and the other element coupled to the output shaft;
   (b) a hydraulic pump having a pressure line and a suction line and including a first pump rotational unit coupled to the hollow wheel and a second pump rotational unit coupled to the output shaft; and
   (c) a hydraulic motor including a first motor unit and a second motor unit rotatable with respect to each other, the motor connected to the suction line and the pressure line of the pump forming a circuit conducting hydraulic fluid from the pump through the motor and back to the pump, the first motor unit being coupled to the driven shaft and the second motor unit being coupled to one of said members.

2. A gearbox as claimed in claim 1, further comprising a pump flow rate adjustor for controlling the hydraulic fluid delivery quantity of the hydraulic pump.

3. A gearbox as claimed in claim 1 or 2, further comprising a motor flow rate adjustor for controlling hydraulic fluid intake volume of the hydraulic motor.

4. A gearbox as claimed in claim 3 further comprising a hydraulic actuator for adjusting a flow rate adjustor.

5. A gearbox as claimed in claim 4 wherein the hydraulic actuator is connected for actuation to a gas pressure or spring reservoir fed by the hydraulic pump.

6. A gearbox as claimed in claim 4 further comprising a rotational speed detector coupled to the hydraulic actuator.

7. A gearbox as claimed in claim 3 wherein the flow rate adjustor is controllably connected to a control computer.

8. A gearbox as claimed in claim 7 wherein the computer is coupled to a rotational speed detector for detecting the speed of the driven shaft.

9. A gearbox as claimed in claim 1 or 2 wherein the hollow wheel is constructed in one piece with a pump unit of the hydraulic pump to form a casing.

10. A gearbox as claimed in claim 1 wherein the hollow wheel has a toothed rim, which drivingly engages a toothed wheel coupled to the hydraulic pump.

11. A method for operating a hydro-mechanical gearbox for controlling the rotation ratio between a driven shaft and an output shaft member, the gearbox comprising: (a) a planetary gear train housed in a housing and having a sun wheel element, a planet carrier element and a hollow wheel, one of said elements coupled to the driven shaft and the other element coupled to the output shaft; (b) a hydraulic pump having a pressure line and a suction line and including a first pump rotational unit coupled to the hollow wheel and a second pump rotational unit coupled to the output shaft; and (c) a hydraulic motor including a first motor unit and a second motor unit rotatable with respect to each other, the motor connected to the suction line and the pressure line of the pump forming a circuit conducting hydraulic fluid from the pump through the motor and back to the pump, the first motor unit being coupled to the driven shaft and the second motor unit being coupled to the housing, the method comprising:

adjusting the gearing ratio of the gearbox by controlling the relative rotational speed between the hollow wheel and the output shaft and by preventing relative rotation of a motor unit and a pump rotational unit at full throttling so that the relative rotational speed between the hollow wheel and the output shaft becomes zero and the output shaft therefore rotates at the same rotational speed as the driving shaft to provide synchronous operation.

12. A method as claimed in claim 11 for providing a pushing or braking operation wherein the intake pump volume of the hydraulic motor is enlarged, the speed of flow inside the oil circuit is, of necessity, increased so that the hydraulic motor drives the hydraulic pump hydraulically, wherein relative rotational speed between the hollow wheel and the output shaft is increased.

13. A method as claimed in claims 11 for providing a reverse speed, wherein hydraulic fluid flow speed is increased by the hydraulic motor and the intake volume of the hydraulic pump is diminished so that the hydraulic motor drives the hydraulic pump hydraulically, and rotational speed of the hollow wheel becomes greater than when the output shaft is at a standstill, so that said output shaft is driven in the opposite direction.

14. A method as claimed in claim 11 for providing an idling state, wherein the rotation of the driving shaft is transferred via a planet gear to the hollow wheel without requiring throttling, and the output shaft does not rotate.

* * * * *